INVENTOR.
JOHN J. CHAMBERLAIN
BY
Willard D. Eakin
ATTORNEY

Feb. 14, 1956     J. J. CHAMBERLAIN     2,734,245
METHOD AND APPARATUS FOR SHAPING ARTICLES OF PLASTIC MATERIAL
Filed Dec. 17, 1951     4 Sheets-Sheet 2
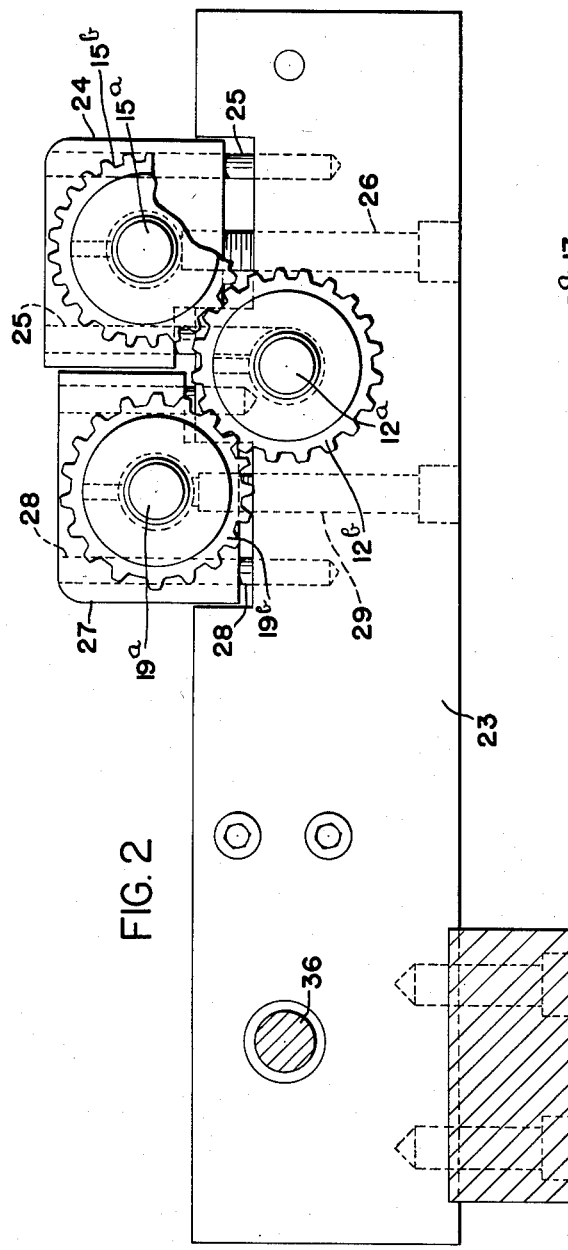
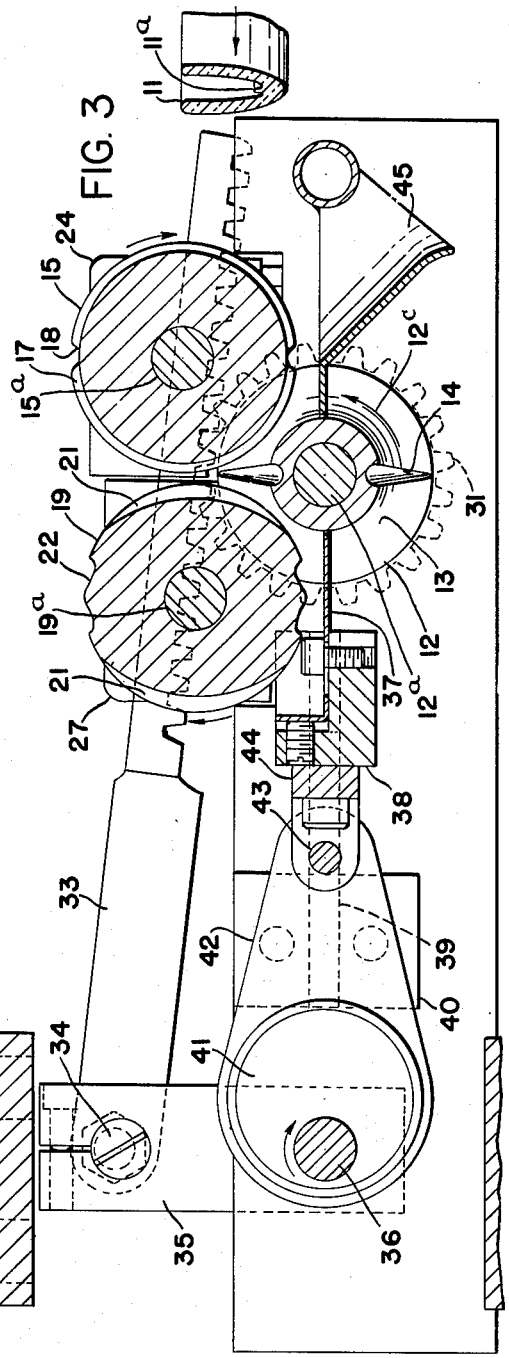
INVENTOR.
JOHN J. CHAMBERLAIN
BY Willard D. Eakin
ATTORNEYS Feb. 14, 1956 J. J. CHAMBERLAIN 2,734,245
METHOD AND APPARATUS FOR SHAPING ARTICLES OF PLASTIC MATERIAL
Filed Dec. 17, 1951 4 Sheets-Sheet 3

*INVENTOR.*
JOHN J. CHAMBERLAIN
BY *Willard D. Eakin*
ATTORNEY

Feb. 14, 1956   J. J. CHAMBERLAIN   2,734,245
METHOD AND APPARATUS FOR SHAPING ARTICLES OF PLASTIC MATERIAL
Filed Dec. 17, 1951   4 Sheets-Sheet 4

INVENTOR.
JOHN J. CHAMBERLAIN
BY Willard D. Eakin
ATTORNEY

United States Patent Office 2,734,245
Patented Feb. 14, 1956

2,734,245

METHOD AND APPARATUS FOR SHAPING ARTICLES OF PLASTIC MATERIAL

John J. Chamberlain, Akron, Ohio, assignor to The United States Stoneware Company, a corporation of Ohio Application December 17, 1951, Serial No. 262,050

6 Claims. (Cl. 25—21)

This invention relates to the shaping of plastic material in continuous-strip form to produce a succession of individual articles of complex form.

The apparatus herein illustrated and described is especially adapted to form, from a plastic such as a clay composition, a particular tower-packing element of which a characteristic is that it is of elongated form, is longitudinally concavo-convex, with is concavity on one side, and is transversely concavo-convex, with the concavity on its other side.

In its present embodiment the invention involves the progressive bending of a channel strip in the direction that is from leg-edges to base, further molding of the bent channel strip, and severing successive lengths from the bent and molded strip.

My chief object is economy in the manufacture of articles from plastic material.

Of the accompanying drawings:

Fig. 1 is a plan view, with parts broken away, of apparatus embodying and adapted for the practice of the invention in its preferred form as applied to the tower-packing elements above referred to.

Fig. 2 is a section on line 2—2 of Fig. 1.

Fig. 3 is a section on line 3—3 of Fig. 1.

Figure 11:
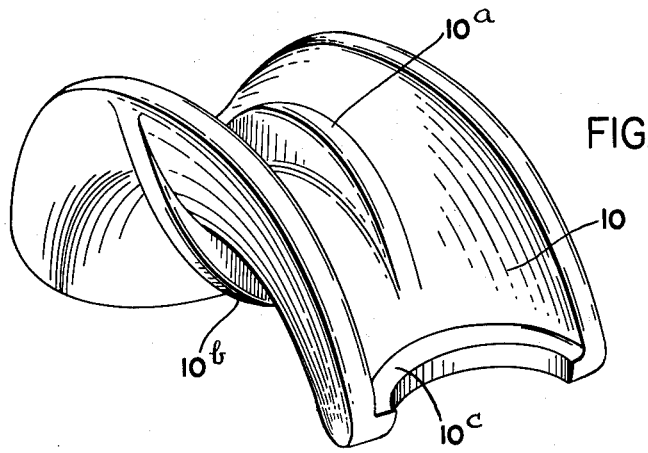
Fig. 11 is a perspective view of the product.

Referring first to Fig. 11, each of the tower-packing elements, that are shaped by the particular apparatus shown in the other figures of the drawings, has a sheet-like body portion 10 which is longitudinally curved to a 180 degree shape and also is transversely curved to a 180 degree shape throughout its length, so that on one side it is longitudinally convex and transversely concave and on its other side is longitudinally concave and transversely convex.

Also this particular type of element is formed with a reinforcing rib 10a extending lengthwise at the middle of the floor of its channel; with a transverse reinforcing rib 10b at the middle of its longitudinally concave side; and, at each end of the piece, within its channel, with a transverse reinforcing rib or flange 10c.

The material, from an extruding machine or from a storage supply, is fed to the apparatus in the form of the continuous strip 11, Fig. 3, of channel form and having a continuous rib 11a at the middle of the floor of its channel.

Figure 9:
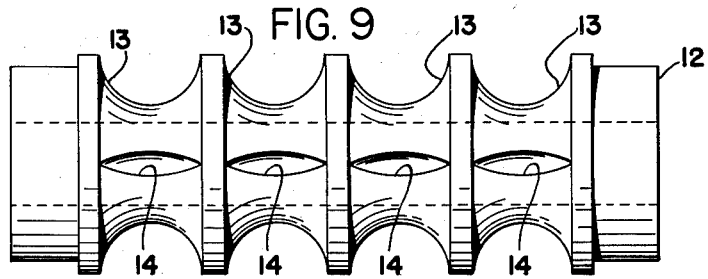
Fig. 9 is a side elevation of a multiple-unit shaping roll about which strips of the material are bent and fed.
Figure 10:
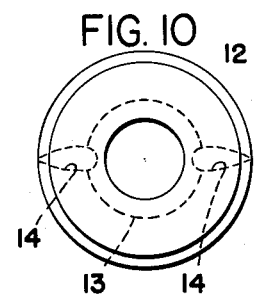
Fig. 10 is an end view of the same.

The apparatus comprises a multiple-unit shaping roll 12, Figs. 9 and 10, formed with a plurality of circumferential shaping grooves, 13, 13, each adapted for shaping the transversely convex back of one of the strips 11 as it is bent about the roll and is carried forward in the groove 13. The roll 12 thus can be called a base roll.

At each of two diametrically opposite positions each of the grooves has its floor shaped with a depression 14 for molding the rib 10b, Fig. 11, of one of the packing elements.

Figure 5:
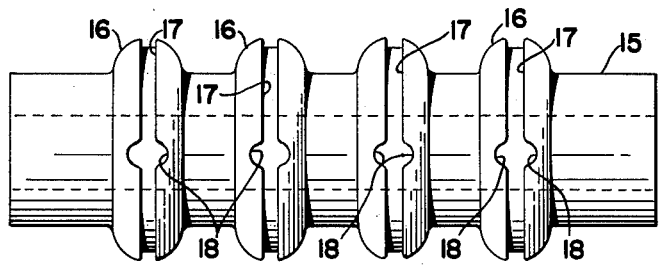
Fig. 5 is a side elevation of a multiple-unit channel-shaping roll.
Figure 6:
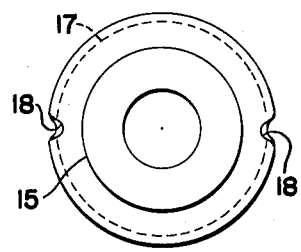
Fig. 6 is an end view of the same.

For the initial progressive pressing of the simultaneously fed strips of stock, a multiple-unit shaping and presser roll 15, Figs. 5 and 6, is formed with a set of circumferential ribs 16, 16, each having at its middle a longitudinal groove 17 for accommodating the rib 11a, Fig. 3, of the continuous strip, and modifying the shape of the rib.

At each of two diametrically opposite positions each of the grooves 17 has its side walls shaped to provide a pair of bays 18, 18 for initiating accumulations of stock for severance to provide two of the end flanges 10c, Fig. 11, for the adjacent pieces 10.

Figure 7:
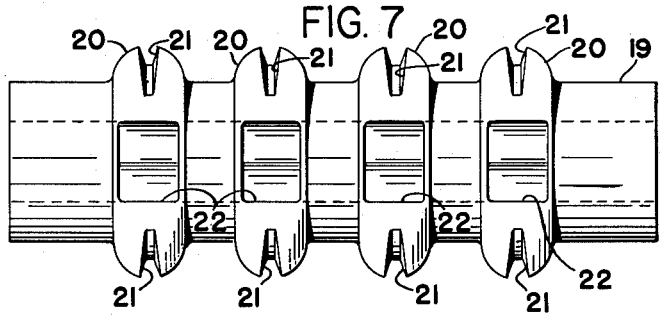
Fig. 7 is a side elevation of another multiple-unit channel-shaping roll.
Figure 8:
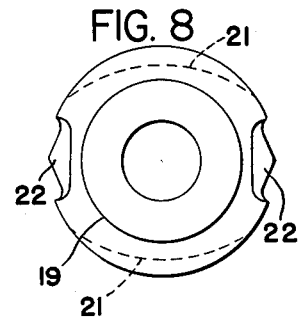
Fig. 8 is an end view of the same.

For causing the continuous strips of stock to bend about the base roll 12 and to shape them in their respective grooves in the base roll, a second shaping and presser roll 19, Figs. 7 and 8, is formed with a plurality of circumferential ribs 20, 20. Each rib 20 has two diametrically opposite depressions 21, 21 for final shaping of respective reinforcing ribs such as the rib 10a, Fig. 11. Also each rib 20 has at each of two diametrically opposite positions a depression 22 of suitable form for final shaping of stock for two of the end flanges 10c, Fig. 11.

The three rolls 12, 15 and 19 are secured upon respective shafts 12a, 15a and 19a (Figs. 1 to 4).

The shaft 12a of the base roll 12 is journaled in the side members 23, 23 of the machine frame. The shaft 15a of the roll 15 is journaled in a pair of bearing blocks 24, 24 each of which is slidingly mounted on a pair of guide pins 25, 25 projecting upward from the frame member. For holding these bearing blocks down to press the roll 15 against the work each of the blocks is provided with an adjustment screw 26, Fig. 2, rotatably extending upward through the frame member and threaded into the block.

The shaft 19a of the roll 19 is journaled in a pair of bearing blocks 27, 27 each of which is slidably mounted upon a pair of guide pins 28, 28 projecting upward from the frame member. For holding these bearing blocks down to press the roll 19 against the work each of the blocks is provided with an adjustment screw 29, Fig. 2, rotatably extending upward through the frame member and threaded into the block.

For driving the presser rolls 15 and 19 from the shaft of the base roll 12 three gears of equal size, 12b, 15b and 19b, are provided in suitable arrangement upon the respective shafts as clearly shown in Fig. 2.

Figure 1:
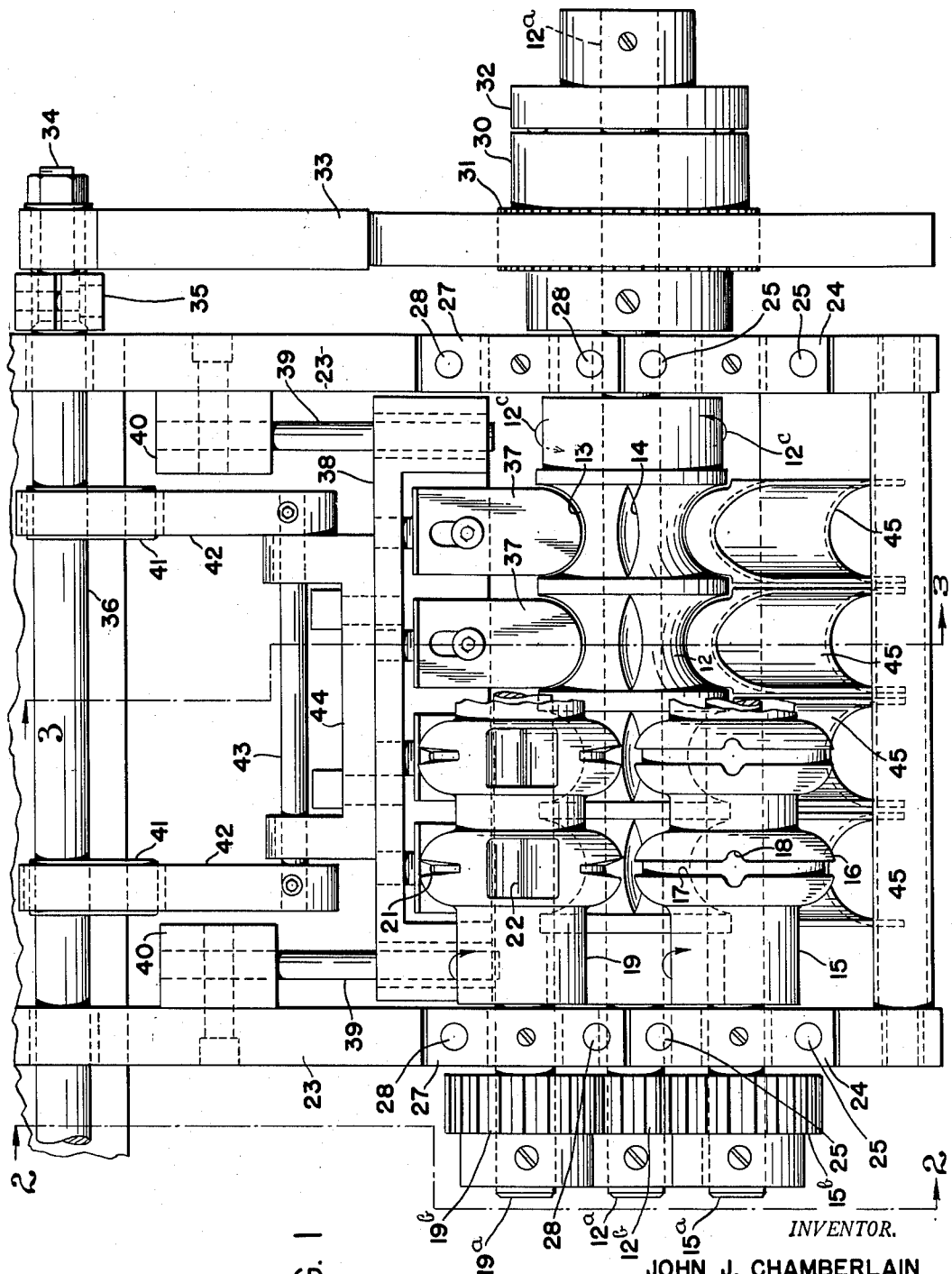
Figure 4:
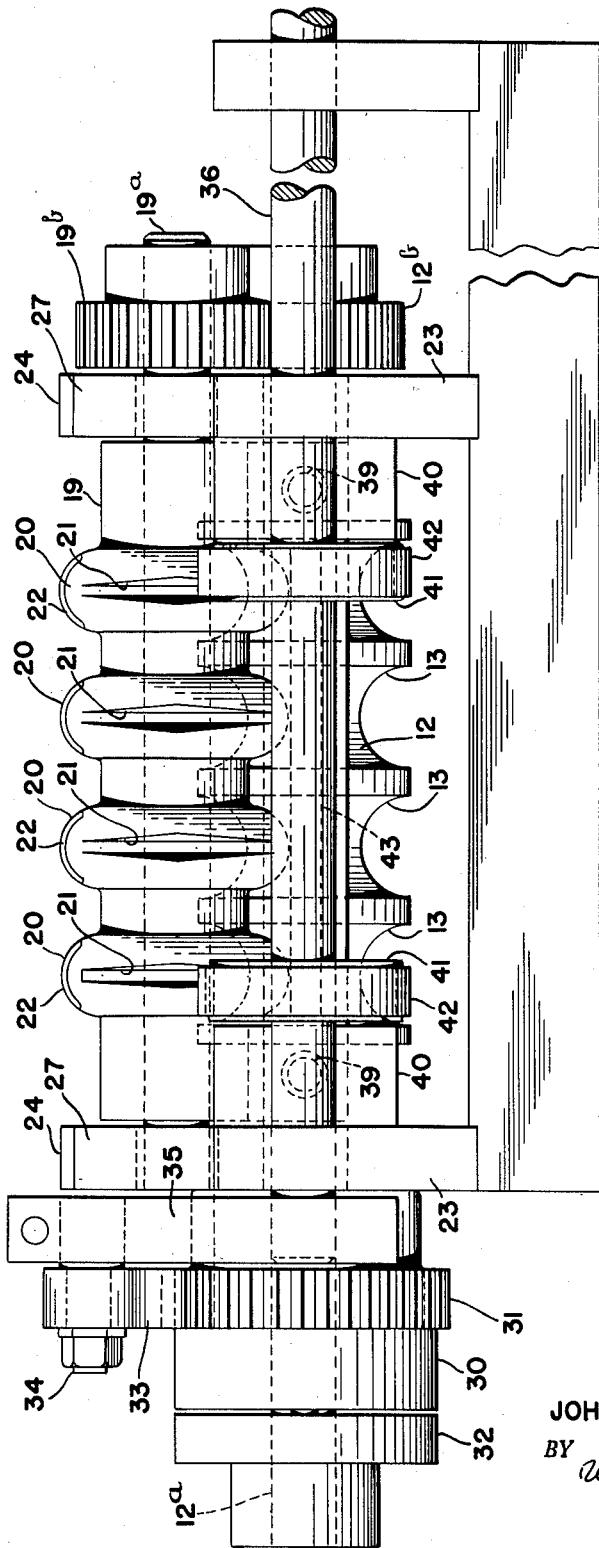
Fig. 4 is an elevation of the apparatus, from the far side of Fig. 1.

For driving the shaft 12a, with its base roll 12, in the direction indicated by the arrows 12c, 12c in Figs. 1 and 3, in successive timed movements of 180° each, a suitable one-way over-run clutch has one of its elements 30 loose-journaled upon the shaft 12a and provided with a rack-pinion 31, Figs. 1, 3 and 4, and has its other element, 32, secured upon the shaft 12a.

Meshed with the pinion 31 is a rack-bar 33 journaled at 34 upon a crank 35. The crank 35 is secured upon a rotary driving shaft 36 which is journaled in the frame and provided with suitable driving means, not shown.

For severing successive finally shaped lengths from each of the strips of stock, while the shaped lengths to be severed are in the parts of the grooves 13 that are in the lower half of the orbit of the base roll 12, as seen clearly in Fig. 3, a set of knives 37, 37 are provided.

These knives 37 are adjustably mounted upon a bar 38 which is guided, for movement of the knives toward and from the base roll 12, upon a pair of guide bars 39, 39 which are mounted in and project from respective bracket blocks 40, 40 secured to the respective frame members 23.

To move the knife-carrying bar 38 forward and back in suitably timed relation to the successive step movements of the work-engaging rolls 12, 15 and 19, a pair of eccentric cams 41, 41 are secured upon the driving shaft 36 and mounted in the respective hubs of a pair of pitman links 42, 42 which are secured to the respective end portions of a cross bar 43 having connection to the knife carrying bar 38 through a hinge bracket 44.

For dislodging the finally shaped and severed lengths of stock from their respective grooves 13 in the base roll 12, a set of stop members 45, 45, Figs. 1 and 3, are mounted upon the frame of the machine and have work-engaging extremities projecting into the respective grooves 13, at positions diametrically opposite the severing knives 37.

In the operation of the apparatus, the leading ends of a set of the continuous stock strips 11, Fig. 3, are brought up to and started through the set of rolls, between the presser roll 15 and the base roll 12, and on between the presser roll 19 and the base roll 12.

The machine is then continuously driven, the driving shaft 36 rotating clockwise as viewed in Fig. 3. In the first half of its revolution, from the condition there shown, the knives 37 are sufficiently withdrawn from the floors and walls of the grooves 13 to clear the way for free passage, past the cutting position, of the leading end portions of the stock strips, the rack moving to the right and the one-way clutch running free during the first quarter revolution, as they have been doing throughout the preceding quarter revolution of the shaft, while the knives were moving inward to sever the strips.

At the end of a quarter of a revolution of the shaft 36, from the condition shown in Fig. 3, the knives 37 have withdrawn half of their distance of withdrawal and the rack 33 is changing from decreasing rightward movement to increasing leftward movement.

In a suitable part of the leftward movement of the rack 33 the over-run clutch 30—32, Fig. 1, engages and drives the rolls 12, 15 and 19 through a half-revolution in less than a half-revolution of the shaft, since the considerable length of the arm 35 gives the rack a high speed and a long range of movement.

At the end of the leftward movement of the rack, at about three-quarters of a revolution of the shaft 36 from the condition of Fig. 3, the feeding of the strips, of course, stops and the cams 41, leading the crank 35 by about 90°, have started to move the knives inward for the next severing operation. That operation is then completed and the knives are sufficiently withdrawn while the rack 33 is making its next rightward movement and an ineffectual first part of its next leftward movement.

In each 180° step movement of the base roll 12 the severed lengths of shaped stock are prevented by the stops 45 from being carried along in the grooves of the roll, and thus they are loosened and caused to drop out of the grooves into a suitable receptacle or onto a suitable conveyor, not shown, for subsequent operations, such as firing in the case of clay products. The rolls are so indexed that the knives sever the strips at the middle of each of the stock accumulations provided by the depressions 22, Figs. 7 and 8, and thus each of the finished pieces is provided with a reinforcing rib or flange 10ᶜ (Fig. 11) at each of its ends.

As above indicated, the ribs 10ᵃ (Fig. 11) are formed in the depressions 21, Figs. 7 and 8, and the ribs 10ᵇ, Fig. 11, are formed in the depressions 14, Figs. 9 and 10.

Modifications are possible without departure from the scope of the invention as defined by the appended claims.

I claim:

1. Apparatus for making a succession of articles of plastic material, said apparatus comprising a base roll formed with a circumferential groove for the feeding of a strip of stock, in the groove, about the roll, means for progressively pressing the strip in the groove as it is so fed, means for driving said base roll in a succession of rotative movements of predetermined lengths, a knife movable inward in the groove for severing successive lengths from the strip and outward in the groove for permitting the strip to pass the knife, and means for so actuating the knife in timed relation to the successive rotative movements of the said base roll.

2. Apparatus as defined in claim 1 and comprising means for dislodging the successive severed lengths from the groove.

3. Apparatus as defined in claim 1 and comprising means for dislodging the successive severed lengths from the groove, the dislodging means comprising a fixed stop member having a part in the recited groove, in position to contact the leading end of each successive severed length of stock and thus loosen it from the walls of the groove by keeping it from rotating with the base roll.

4. Apparatus for making a succession of articles of plastic material, said apparatus comprising a base roll formed with an annular circumferential groove for receiving in said groove a continuous strip of wholly plastic stock drawn into said groove by rotation of said base roll, a presser roll geared to said base roll and mounted for rotation with its periphery extending into the said groove of the said base roll, the said periphery and the wall of said groove both being formed as repeat-pattern molding surfaces, the said groove being of such depth and the repeat patterns and the relative peripheral speeds of the rolls being such that the said strip, as it leaves the said pressure roll, remains seated in said groove throughout a substantial arc of the orbit of the said base roll, a cutter acting against and complemental in shape to the wall of the said groove for severing said strip into successive lengths while it remains seated in said groove in the said arc of the said orbit, and means for thereafter dislodging the successive severed lengths from said groove.

5. Apparatus as defined in claim 4 and comprising, in addition to the presser roll there defined, a second such presser roll, but with its repeat-pattern more accentuated than that of the first, said presser rolls acting against the strip of stock in succession and thus cumulatively shaping it in a succession of molding steps.

6. A method of making a succession of articles of plastic material which comprises providing a continuous strip of wholly plastic stock of deep channel form, longitudinally feeding and thus progressively bending said strip to longitudinally curved form with the base of the channel at the inner side of the curve while preserving substantially its original channel form, further feeding said strip in said arcuate path past a shaping position and then past a severing position, at said shaping position shaping said strip as a succession of repeat-pattern units by molding the strip both internally and externally while maintaining it in generally concavo-convex shape both longitudinally and transversely, and at said severing position severing the molded strip to separate the said repeat-pattern units in succession from the continuous strip.

References Cited in the file of this patent

UNITED STATES PATENTS

| | | |
|---|---|---|
| 753,981 | Hoelsche | Mar. 8, 1904 |
| 1,642,657 | Frick | Sept. 13, 1927 |
| 1,663,762 | Johnson | Mar. 27, 1928 |
| 1,894,394 | Brown | Jan. 17, 1933 |
| 2,113,717 | Brown | Apr. 12, 1938 |
| 2,349,829 | Nydegger et al. | May 30, 1944 |
| 2,620,513 | Cryor et al. | Dec. 9, 1952 |